United States Patent Office 3,259,511
Patented July 5, 1966

3,259,511
ANTI-LIVERING AGENTS
Charles T. Rairdon, Somerville, and William E. Hanson, Somerset, N.J., assignors to Johns-Manville Corporation, New York, N.Y., a corporation of New York
No Drawing. Filed Sept. 5, 1962, Ser. No. 221,446
9 Claims. (Cl. 106—263)

FIELD OF INVENTION

The present invention relates to antiskinning and antioxidizing agents in sealing compounds, drying oils, paint and varnish compositions.

In the manufacture of various compositions such as sealing compounds, paints and varnishes which include the incorporation of drying oils therein, it is customary to employ a suitable quantity of an oxidation catalyst to speed up the normal drying rate of the composition so that it will dry hard within a reasonable time after it is spread on a surface in a thin film. This oxidation catalyst is commonly called a dryer. However, while the dryers employed induce various necessary and desirable oxidation phenomena, they also impart some characteristics which are very objectionable.

More specifically, the quick drying coating compositions have been attended by the tendency of these coating compositions to change consistency on storage so as to gel and skin on standing in the closed container and particularly when the container is opened and the contents exposed to the air. Additionally, the drying varnishes, paints, or enamels when applied to surfaces, also have the tendency, upon drying and after slight weathering action, to show cracks, roughness, brittleness, peeling and a general breakdown of the film structure. In the case of a varnish, the breakdown of a drying oil film may be due to a peculiar gel structure which is probably the result of the manner of cooking the resin and drying oil; for if the oil-resin mixture is cooked for too long a period, the gel structure formed may be of a type which will not weather satisfactorily.

As explained above many types of these air-hardenable coating compositions when exposed in bulk to air either in open or closed containers, tend to develop tough, rubber-like skins over or near exposed surfaces or to become thick or livery, and no amount of stirring will serve to restore their normal homogeneous character. It is obvious that this capacity for becoming heterogeneous, commonly referred to as "skinning," is not merely the result of gravitational separation of constituents, such as results when a heavy pigment settles in a vehicle, or of the cooking cycle, but is chemical in nature.

This phenomenon of skinning has been attributed to oxidation or to polymerization in the presence of oxygen of certain constituents, such as the drying oils or resins, which give to the compositions their ability to "air-harden" and thus to form durable coatings. This polymerization is evidenced by an increase in the viscosity or body of the combination. It is possible that the presence of the pigment influences the conjugation of double bonds in the vehicle which in turn promotes polymerization. Additionally, it has been theorized that livering is caused by soap formation between the acidic portion of the vehicle and the basic constituents of the pigments. Hence, the actual cause of livering may be colloidal in nature influenced by the soap formation between pigment and vehicle.

However, regardless of the reason for skinning, the property of air-hardening is necessary for the normal uses of such compositions, and it is apparent that efforts to eliminate the skinning and related phenomena must at the same time avoid an objectionable loss of the air-hardening properties of the composition in film form.

It is known that many organic compounds, when present in such coating compositions, prevent or at least inhibit the skinning previously referred to, and materials which inhibit these effects will be referred to herein as "anti-livering agents." Such additives may be illustrated by U.S. Letters Patent Nos. 2,228,487 and 2,306,016 which are directed to the use of oximes.

However, if the previously known anti-livering agents are added in proportions much above those required to develop their antiskinning properties, they tend to prolong or prevent air-hardening of the compositions in film form; the allowable concentrations differ according to the nature of the coating compositions. The maximum concentration suitable for one type of composition may be too large for another and may retard drying of the latter to an objectionable degree. On the other hand, the minimum concentration suitable for one coating composition may be inadequate to prevent development of skinning effects in another. It had been determined that the maximum concentration employable with such agents is not over about 0.2 gram of anti-livering agent per 100 ccs. of coating composition.

This invention overcomes the above-mentioned difficulties and provides an anti-livering agent or viscosity stabilizer for the above-described vehicles.

Specifically, it has been discovered that the incorporation of relatively small amounts of a hydroxylated aliphatic amine, such as monoethanolamine, into a vegetable oil base, filler-containing compound, which would normally harden rapidly, will prevent or greatly reduce the rate of skinning.

OBJECTS

It was therefore an object of the present invention to provide new anti-livering agents and particularly antiskinning agents which, when present in very low concentrations, have the property of inhibiting skinning or loss of the normal homogeneous character of air-hardenable coating compositions, but which, even when present in much higher concentrations, do not adversely affect the drying of such compositions in film form.

It was another purpose of this invention to prevent or delay livering or progressive hardening of pigmented or filled vehicles such as sealing compounds, which would not interfere with the normal performance of the product when used.

Other objects and further scope of applicability of the present invention will become apparent from the detailed description given hereinafter.

BRIEF DESCRIPTION OF THE INVENTION

It has been found that a relatively small amount of a hydroxylated aliphatic amine imparts stability or resistance to hardening to the pigment-vehicle composition. The degree of regulation and the effectiveness of the anti-livering agent are to a certain extent governed by the concentration of anti-livering agent used.

By hydroxylated aliphatic amines are meant those compositions represented by the general formula RNR'R" wherein R is an hydroxylated alkyl group such as an ethanol radical ($-CH_2-CH_2OH$), and R' and R" either hydrogen or an hydroxylated alkyl group. R, R', and R" may all be the same hydroxylated alkyl group. Certain of the hydroxylamines are also useful and particularly the $\beta$-hydroxylamines.

By hydroxylamines is meant the group of organic compounds containing the monovalent $NH_2O$-group (alpha-hydroxylamines), or the monovalent-NHOH (beta-hydroxylamines). The alpha-hydroxylamines are organic compounds derived from hydroxylamine by substituting the hydroxyl hydrogen by an aryl or alkyl radical $NH_2OAr$ (aroxyl amine) or $NH_2OAk$ (alkoxyl amine). The beta-hydroxylamine is an organic compound derived from the hydroxylamine by substituting the hydrogen of the amine group by an alkyl or aryl radical. Representative of the hydroxylated aliphatic amines which impart this stability to the pigment-vehicle are the β-hydroxylamines: monoethanolamine and diethanolamine.

These ingredients are generally used in proportions of 0.01 to 10.0% of the weight of the vehicle.

GENERAL DESCRIPTION OF THE INVENTION

The anti-livering agents are incorporated into the vehicle by simple stirring or mixing. After the anti-livering agent has been incorporated into the vehicle, the pigments, extenders and reinforcing media may be dispersed. Dispersion may be accomplished by high sheer grinding or mixing, sigma blade mixing or simple stirring to obtain the desired consistency. Generally the additive does not alter the consistency of the product materially.

A more complete understanding of the invention may be obtained by reference to the following examples of compositions within the scope of this invention. In these examples all parts and percentages are by weight unless otherwise indicated.

*Example I*

| | Parts |
|---|---|
| Rapeseed oil, bodied | 100 |
| Monoethanolamine | ½ to 6 |
| Talc | 60 to 120 |
| Asbestos fiber | 30 to 90 |

*Example II*

| | |
|---|---|
| Rapeseed oil, bodied | 100 |
| Diethanolamine | ½ to 6 |
| Talc | 60 to 120 |
| Asbestos fiber | 30 to 90 |

*Example III*

| | |
|---|---|
| Soyabean oil, bodied | 100 |
| Monoethanolamine or diethanolamine | ½ to 8 |
| Talc | 50 to 130 |
| Asbestos fiber | 30 to 90 |

*Example IV*

| | |
|---|---|
| Linseed oil, bodied | 100 |
| Mono- or diethanolamine | ½ to 10 |
| Talc | 50 to 100 |
| Asbestos fiber | 30 to 80 |

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein but only in accordance with the appended claims, when read in the light of the foregoing description.

What we claim is:

1. A method of inhibiting the formation of skin on the surface of a composition containing a drying oil comprising adding to said drying oil, in an amount sufficient to inhibit skinning of said composition, an anti-skinning agent consisting essentially of an organic aliphatic amine of the general formula RNR′R″ wherein R is a hydroxylated alkyl radical and R′ and R″ are selected from the group consisting of hydrogen and hydroxylated alkyl radicals.

2. A method as defined in claim 1 wherein the aliphatic amine is present in about 0.01 to 10.0% by weight of the said drying oil.

3. A method as defined in claim 1 wherein the aliphatic amine is diethanolamine.

4. A method as defined in claim 1 wherein the aliphatic amine is monoethanolamine.

5. A composition comprising a drying oil, which composition tends to deteriorate and form a skin when in contact with air, containing an anti-skinning agent, in amount sufficient to inhibit skinning of said composition, consisting essentially of an aliphatic amine of the general formula RNR′R″ wherein R is an hydroxylated alkyl radical and R′ and R″ are selected from the group consisting of hydrogen and hydroxylated alkyl radicals.

6. A composition as defined in claim 5 wherein the aliphatic amine is present in about 0.01 to 10.0% by weight of the drying oil.

7. A composition as defined in claim 5 wherein the aliphatic amine is diethanolamine.

8. A composition as defined in claim 5 wherein the aliphatic amine is monoethanolamine.

9. A composition as defined in claim 5 comprising a sealing compound additionally containing asbestos fibers and filler.

References Cited by the Examiner

UNITED STATES PATENTS

| 2,153,841 | 4/1939 | Mills | 106—263 |
| 2,306,016 | 12/1942 | Eitelman | 106—263 |
| 2,377,030 | 5/1945 | Norris | 106—263 |
| 2,403,423 | 7/1946 | Zurcher | 106—263 |
| 2,877,130 | 3/1959 | Caron et al. | 106—263 |

ALEXANDER H. BRODMERKEL, *Primary Examiner.*

MORRIS LIEBMAN, *Examiner.*

J. E. CARSON, L. HAYES, *Assistant Examiners.*